No. 619,707. Patented Feb. 14, 1899.
F. F. RAYMOND, 2d.
HEEL ATTACHING MACHINE.
(Application filed Aug. 17, 1889.)
(No Model.) 7 Sheets—Sheet 3.

WITNESSES.
A. P. Porter
J. T. Ball

INVENTOR.
F. F. Raymond 2d

No. 619,707. Patented Feb. 14, 1899.
F. F. RAYMOND, 2d.
HEEL ATTACHING MACHINE.
(Application filed Aug. 17, 1889.)
(No Model.) 7 Sheets—Sheet 4.

Witnesses. Inventor.

No. 619,707. Patented Feb. 14, 1899.
F. F. RAYMOND, 2d.
HEEL ATTACHING MACHINE.
(Application filed Aug. 17, 1889.)

(No Model.) 7 Sheets—Sheet 5.

WITNESSES.
A. P. Porter
J. T. Ball

INVENTOR.
F. F. Raymond

No. 619,707. Patented Feb. 14, 1899.
F. F. RAYMOND, 2d.
HEEL ATTACHING MACHINE.
(Application filed Aug. 17, 1889.)
(No Model.) 7 Sheets—Sheet 6.
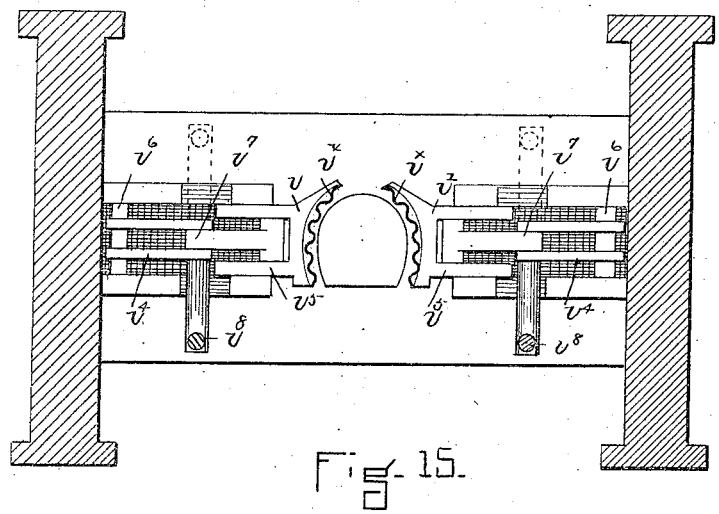
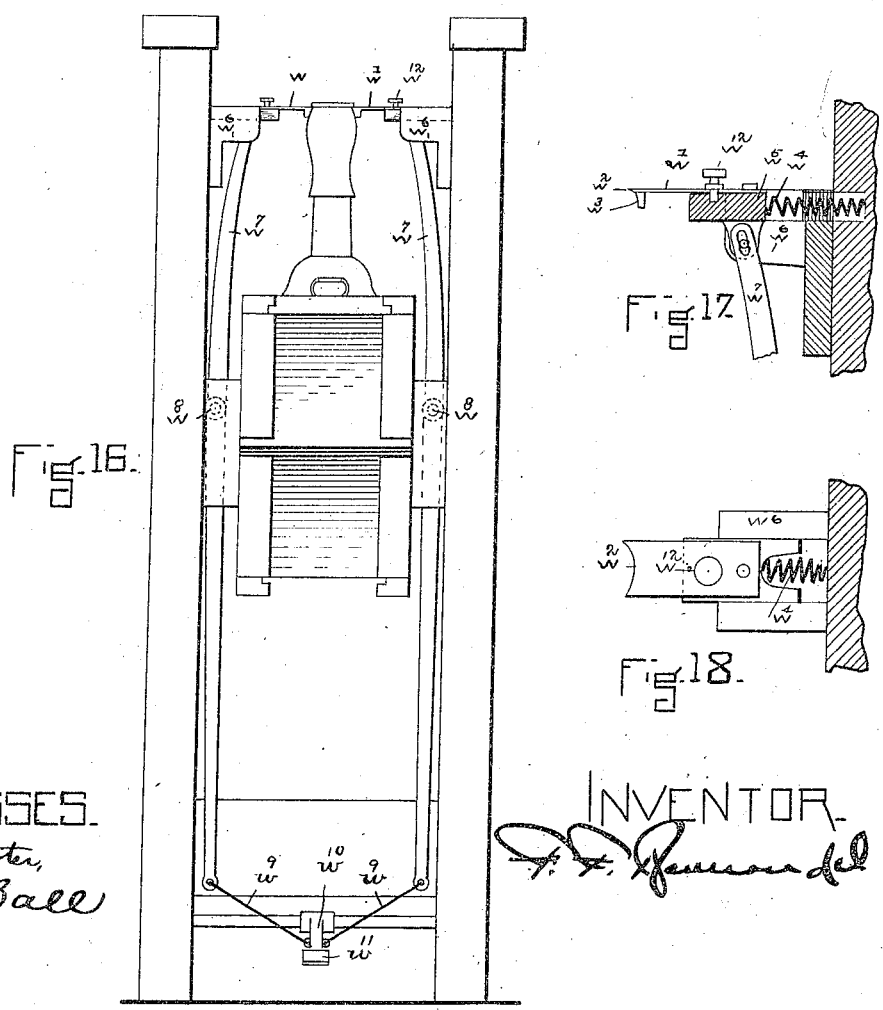
WITNESSES.
A. P. Porter,
J. T. Ball
INVENTOR.
F. F. Raymond 2d No. 619,707. Patented Feb. 14, 1899.
F. F. RAYMOND, 2d.
HEEL ATTACHING MACHINE.
(Application filed Aug. 17, 1889.)
(No Model.) 7 Sheets—Sheet 7.
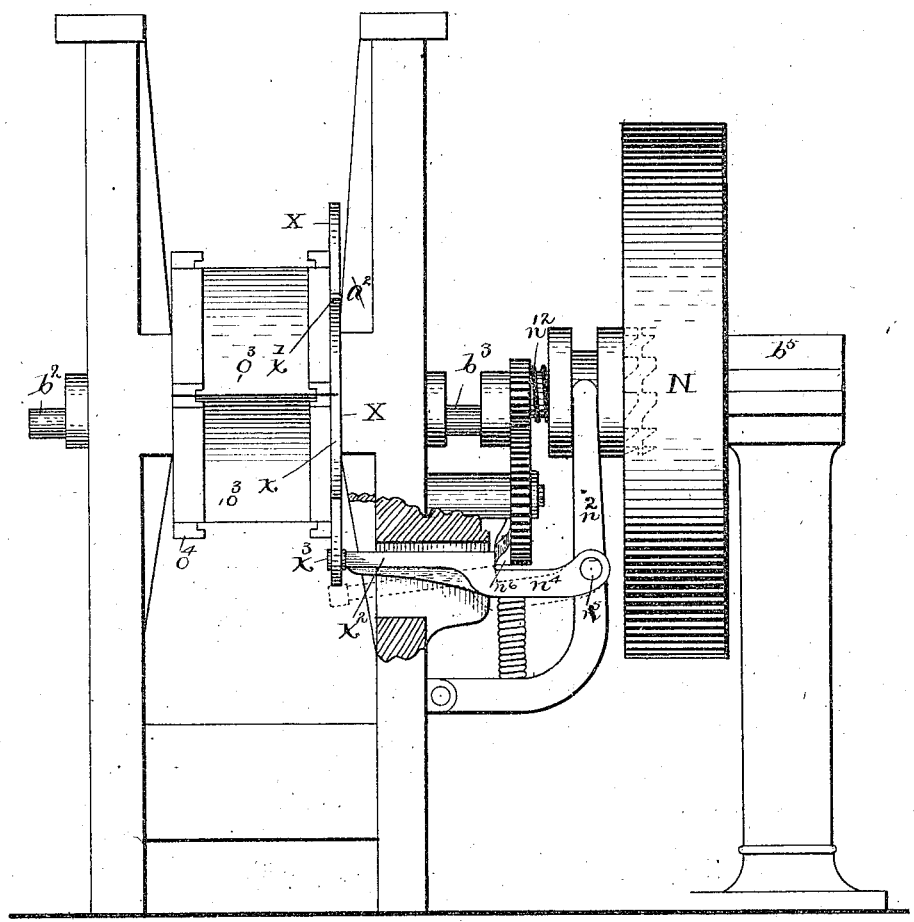
Fig. 19.
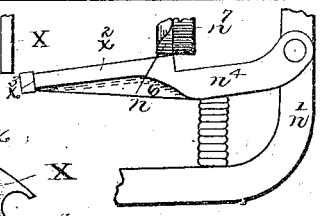
Fig. 20.
Fig. 21.
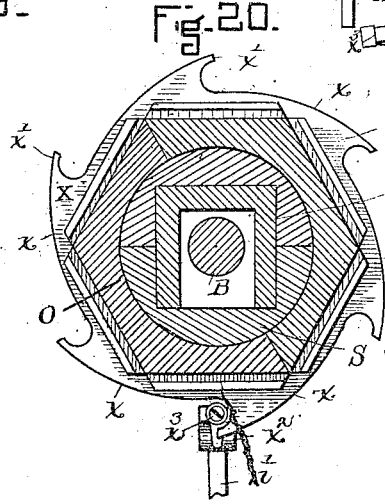
WITNESSES
A. P. Porter
J. T. Ball
INVENTOR
F. F. Raymond 2d

UNITED STATES PATENT OFFICE.

FREEBORN F. RAYMOND, 2D, OF NEWTON, MASSACHUSETTS, ASSIGNOR TO JAMES W. BROOKS, OF PETERSHAM, AND JOHN BROOKS, OF CAMBRIDGE, MASSACHUSETTS, TRUSTEES.

HEEL-ATTACHING MACHINE.

SPECIFICATION forming part of Letters Patent No. 619,707, dated February 14, 1899.

Application filed August 17, 1896. Serial No. 521,188. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Heel-Attaching Machines, of which the following is a full, clear, and exact description, reference being had to the accompanying drawings, forming a part of this specification, in explaining its nature.

The invention relates to an organized machine for attaching heel-blanks.

Figure 1:
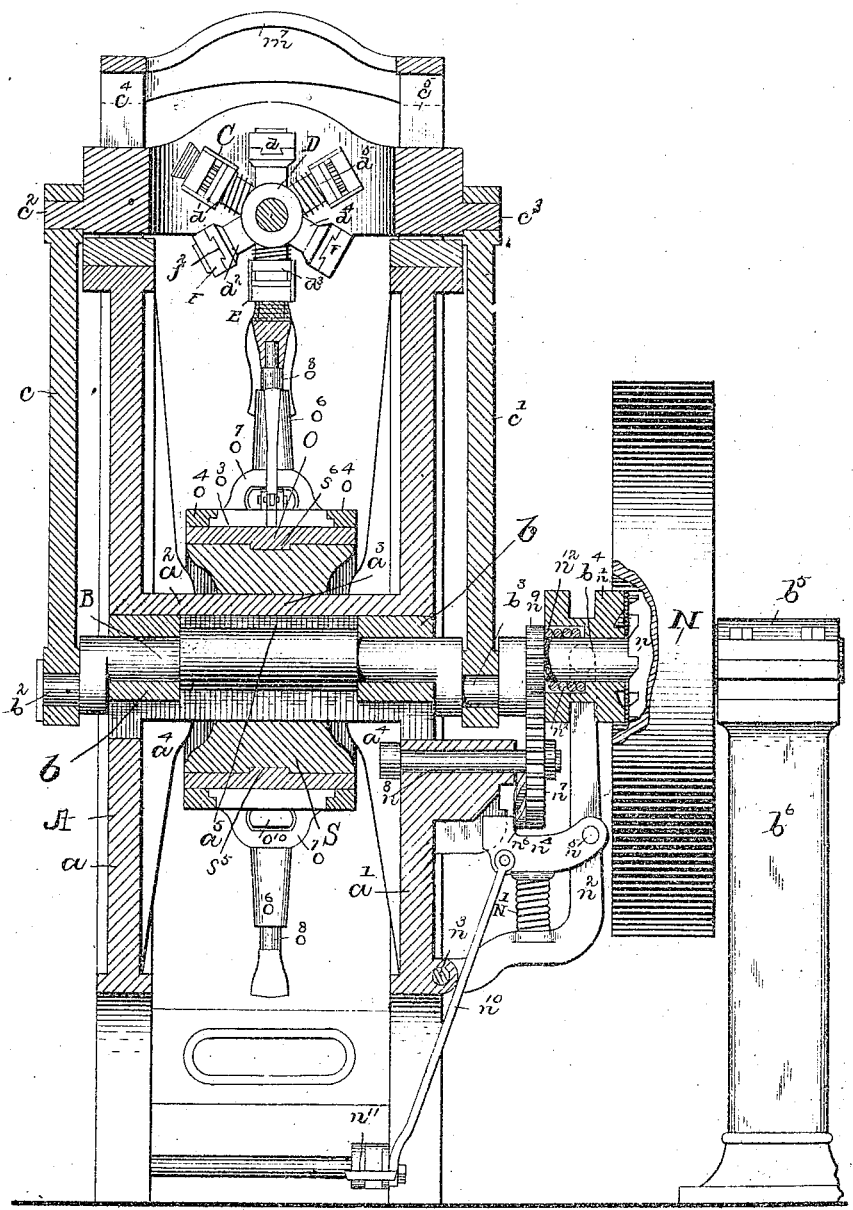
Figure 2:
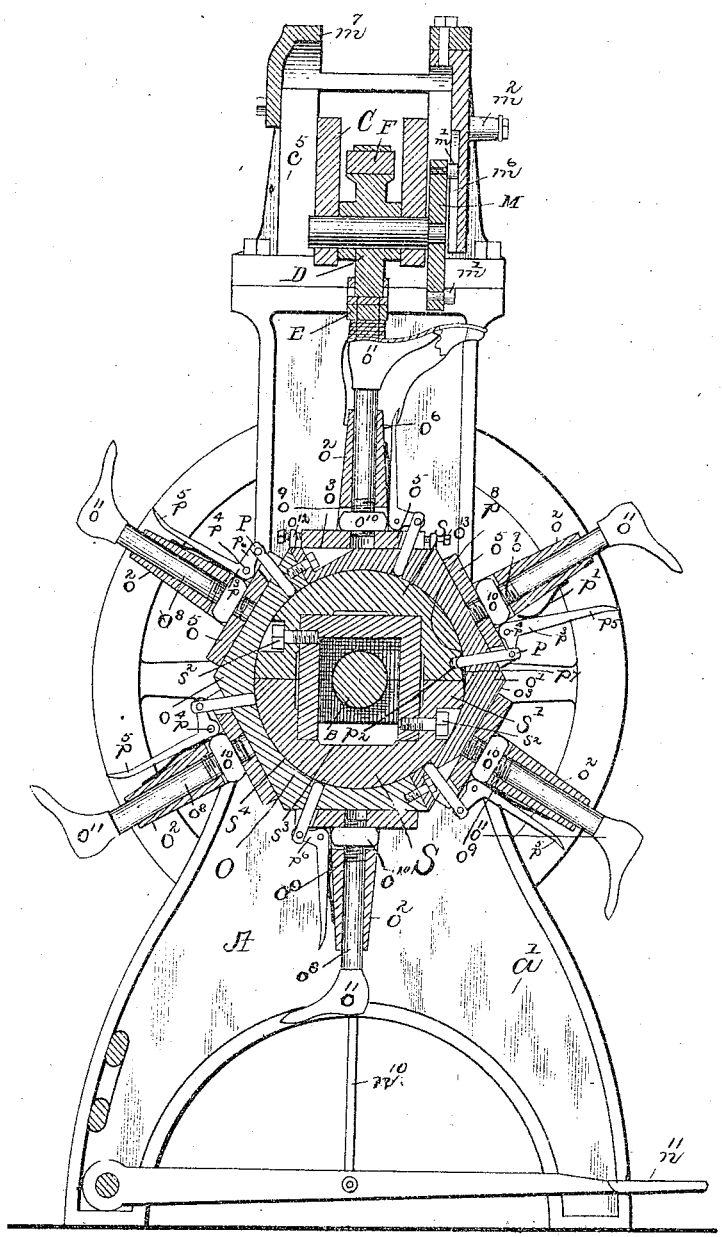
Figure 3:
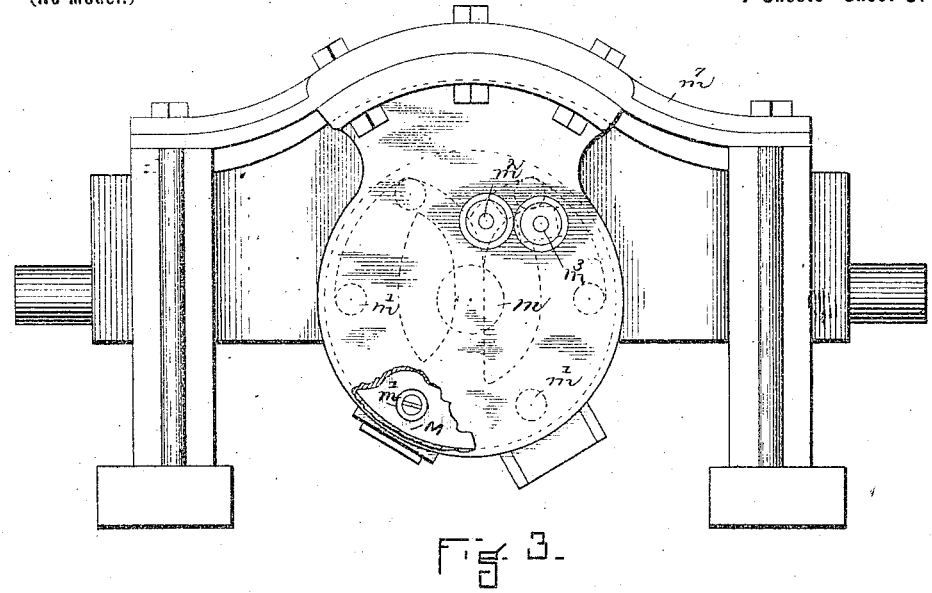
Figures 4, 5:
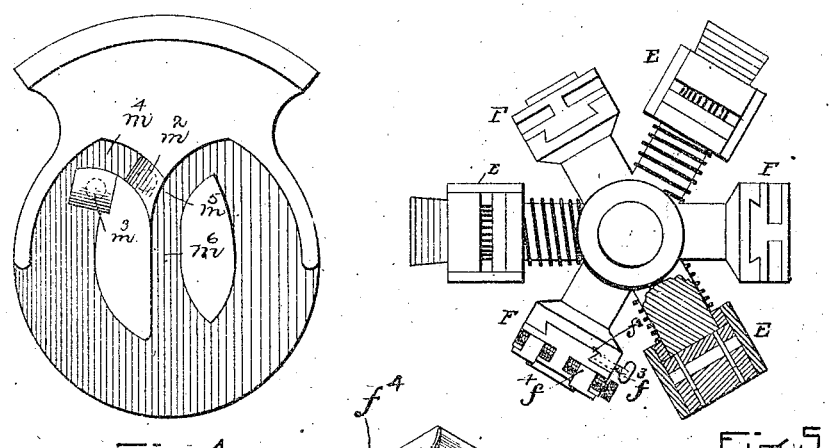
Figure 6:
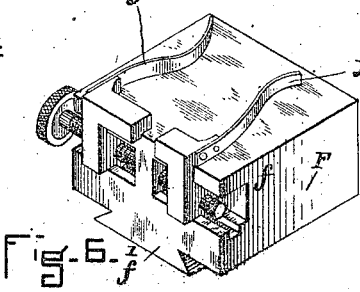
Figure 7:
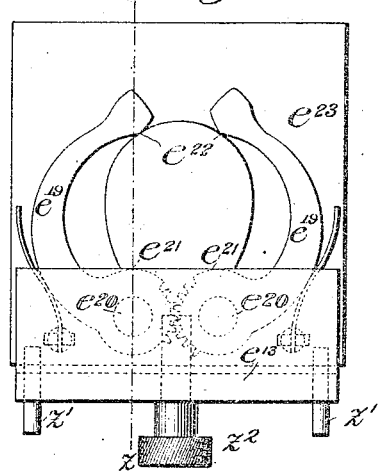
Figure 8:
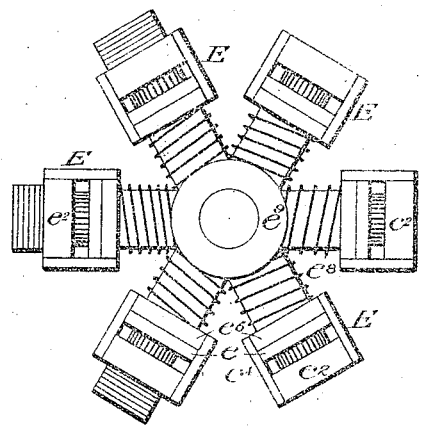
Figure 9:
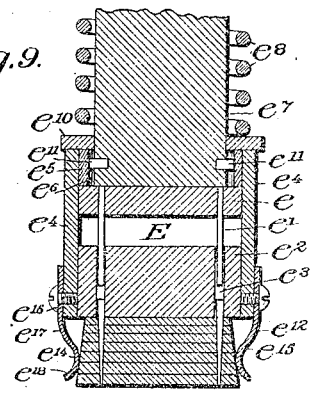
Figure 10:
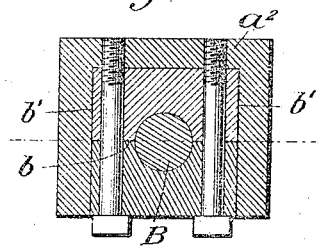
Figure 11:
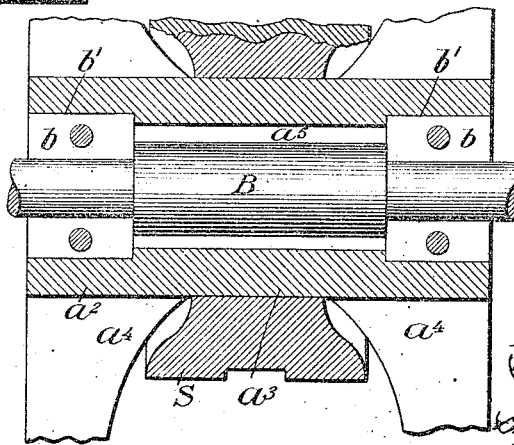
Figure 12:
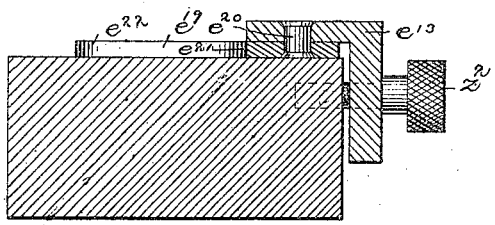
Figure 13:
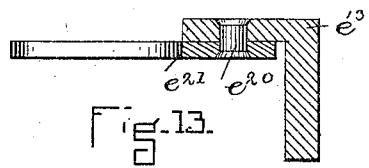
Figure 14:
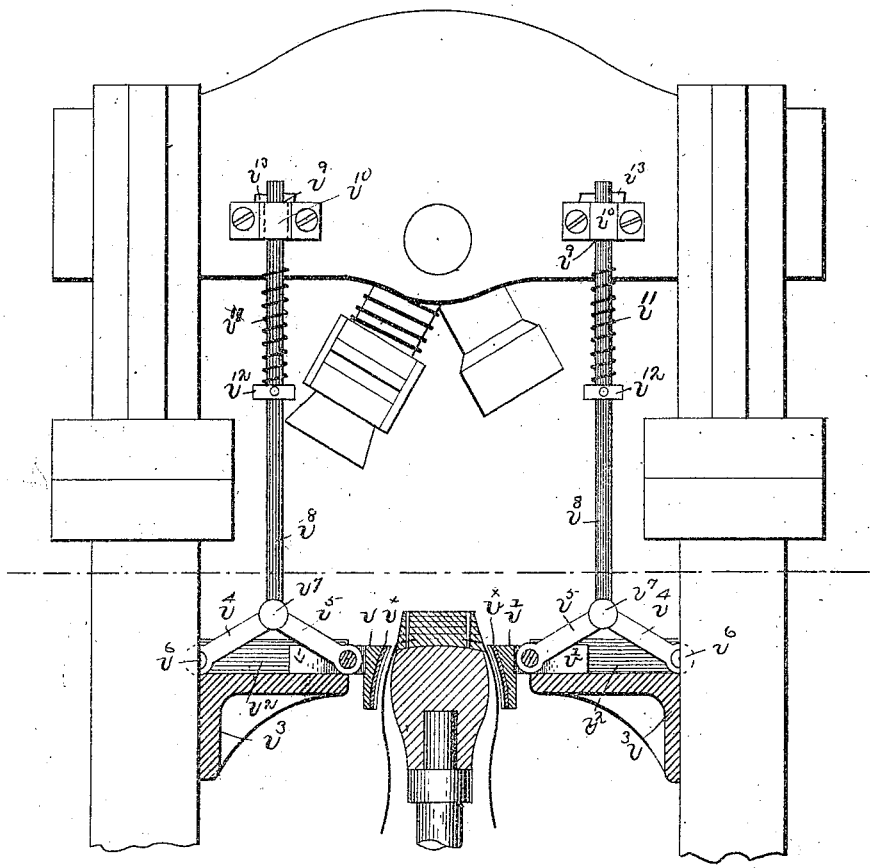

Referring to the drawings, Figure 1 is a view, principally in vertical central section, of the machine having the features of my invention. Fig. 2 is a view in vertical section from front to rear of said machine. Fig. 3 is a view in front elevation of the upper part of the machine enlarged, a portion of the cam-plate being broken out to show the mechanism behind it. Fig. 4 is a view in elevation of the back of the cam-plate. Fig. 5 is a view of the rotary head removed from the machine, principally in elevation. Fig. 6 is a view of the top-lift spanker-block of the rotary head. Fig. 7 is a view of a heel-blank and top-lift holder varying somewhat from that represented in Fig. 5. Fig. 8 represents in elevation a rotary head having a somewhat different organization of attaching device from that represented in Fig. 5. Fig. 9 represents an arm of the rotary head in its lowest position with the heel-blank secured thereto in position for attachment to the boot or shoe. Fig. 10 is a detail view, in vertical section, representing the manner of fastening one of the boxes of the main shaft to the machine. Fig. 11 is a view in horizontal section taken upon a line with the center of the shaft-boxes. Figs. 12 and 13 are views further illustrating the heel-blank and top-lift holder represented in Fig. 7. Fig. 14 represents, principally in elevation, the central and upper parts of the machine equipped with an automatic shoe centering and holding device. Fig. 15 is a view, part in horizontal section and part in plan, of said centering device. Figs. 16, 17, and 18 represent modified forms of said centering device, to which reference is hereinafter made. Figs. 19, 20, and 21 illustrate the mechanism employed to automatically start the machine when the jacks are moved into operative position.

A is the frame of the machine. It preferably is made integral or in one casting, and it comprises the side sections $a$ $a'$, which are connected with each other by a substantial horizontal connection $a^2$, which preferably has a median section $a^3$ and arched or curved downward extensions $a^4$. This connecting-section $a^2$ has a longitudinal hole or cavity $a^5$, through which extends the shaft B. The boxes $b$ for the shaft preferably are set or held in recesses $b'$, cast in the side of the frame. The shaft B has the cranks $b^2$ $b^3$, one on each side of the machine. It also has the extension $b^4$, the outer end of which is supported in a box $b^5$, carried or held by a bracket $b^6$. The cranks $b^2$ $b^3$ are connected with a cross-head C by means of pitmen $c$ $c'$, the pitman $c$ extending from the crank $b^2$ to the pin or stud $c^2$ at one end of the cross-head C and the pitman $c'$ connecting the crank $b^3$ with the pin or stud $c^3$ on the other end of the cross-head. The side sections $a$ $a'$ support or carry guides $c^4$ $c^5$, upon which the cross-head C is movable. The cross-head carries a rotary head D. This rotary head preferably has six arms $d$ $d'$ $d^2$ $d^3$ $d^4$ $d^5$, although the head may have a greater or less number of arms; but I prefer this number as being most convenient for reasons hereinafter stated. The arms of the rotary head are arranged or adapted to be variously used according to the style of nailing which it is desired to do.

In Fig. 5 I have represented the alternate arms as provided with devices for the attachment of a loaded heel-blank and alternate arms with top-lift holding and spanking devices. In Fig. 8 I have represented all the arms as provided with devices for attaching loaded heel-blanks.

The device E for attaching a heel-blank comprises a block $e$, carrying a gang of drivers $e'$, and removably secured to the end of its supporting-arm of the rotary head a nail or heel-holder block $e^2$, having holes $e^3$ to receive the drivers $e'$ and preferably attached to the arm of the rotary head by the side pieces $e^4$ and slide block or ring $e^5$, which is provided, preferably, with a circular hole $e^6$ to fit the said arm, which is made cylindrical at $e^7$ to permit the block or ring to slide upon it. There is also carried by the arm a coil-spring $e^8$, which surrounds the cylindrical section $e^7$ and is confined between the hub $e^9$ of the head and a washer $e^{10}$, which bears against the block or ring $e^5$. (Shown in Fig. 9.) The office of this spring is to hold the nail-block $e^2$ away from the driver-block $e$, so that the holes $e^3$ shall not be occupied by any material length of the drivers $e'$, or not sufficient, at any rate, to prevent them from receiving the ends of the nails of the loaded heel-blank. Of course the nail-block $e^2$ and ring or block $e^5$ and side plates $e^4$ are also removable from the arm, but the spring and washer are not, the washer being held by pins $e^{11}$ from being pushed from the arm upon the removal of the driver-holding block and nail-block. It will thus be apparent that the nail-block is adapted to move radially or toward and from the end of its carrying-arm and independently of said arm, but that it is non-movable laterally in relation to said arm. It is not necessary or even desirable that the nail-block should be movable laterally, as the adjustment of the shoe to the heel in all heel-attaching machines is obtained by moving the last or jack which supports the shoe rather than by moving the heel-attaching devices.

The nail-block $e^2$ may also have the heel-holder $e^{12}$, adapted to bear against the sides of the heel to hold it upon the under surface of the block $e^2$ while it is being moved from the position in which it was when the heel was so located to the position in which it is attached to the boot or shoe. This heel-holder may be of any desired form, and in Fig. 9 I have represented it as made of the two springs $e^{14}$ $e^{15}$, preferably made of flat metal, attached at $e^{16}$ to opposite sides of the block $e^2$ and having the inward bends $e^{17}$ above the surface of the block and the outward bends $e^{18}$.

In Figs. 7 and 12 I have shown a heel-holder comprising the arms $e^{19}$, pivoted at $e^{20}$ either to the block at or near its front edge or to the under surface of an adjustable plate $e^{13}$. The arms preferably are geared together, and they have the rounded breast-shoulders $e^{21}$ and the end $e^{22}$, which bear against the sides of the heel near the back end. The ends of the arms are preferably inclined outward. It is desirable to use the adjustable plate $e^{13}$, as this provides the holder with an adjustment upon the block to vary the position of the breast of the heel-blank. I have represented the arms $e^{19}$ as pivoted to the inner surface of this plate, so that they are between the plate and the surface of the block. The plate is angular in shape, and through it there extend two guiding-pins $z'$, (see Fig. 7,) fixed in the block, and an adjusting-screw $z^2$, the threaded end of which enters a threaded hole in the front of the block. By turning the screw the arms are moved backward or forward upon the block.

I would say that in lieu of the heel-blank-attaching device E there may be used a nail-driving device like that represented in Fig. 7, and comprising a flat driving-block $e^{23}$, preferably having upon its surface a heel-holder like that already described.

When the heel is to be flush-nailed, the drivers $e'$ are of a length to extend to the under surface of the block $e^2$. When they are blind-nailed, the drivers are shortened about an eighth of an inch, so that their ends do not extend to within about an eighth of an inch of the surface of the block $e^2$, and when the block $e^{23}$ is used for blind-nailing it has formed in it a channel or separate holes about an eighth of an inch deep.

The top-lift holder or spanker F preferably comprises a block $f$, having a dovetail extension $f'$ on its under surface, by which it is secured to its arm of the rotary head, the said arm having a dovetail recess $f^2$ to fit the dovetail $f'$ of the block, and this permits the block $f$ to be laterally adjustable upon the arm, a set-screw $f^3$ serving to fasten it in any desired position thereon. This top-lift spanker-block has a top-lift centering and holding device $f^4$, as represented in Fig. 6, and which is like that described in the Henderson patent, No. 316,894, or it may have a top-lift holder consisting of a device substantially like the heel-holding mechanism represented in Fig. 7. These devices are located upon their respective arms, as above stated, according to the work to be done.

The rotary head may be turned automatically or by hand. It is preferable that it be turned automatically. This mechanism is shown in Figs. 3 and 4, and it comprises a disk M, fastened to the shaft $m$ of the rotary head, having the six cam-pins $m'$ extending from the face thereof, and a turning-block having the latches $m^2$ $m^3$, the inclined or curved surfaces $m^4$ $m^5$, and the centering-groove $m^6$. This turning-block is supported by a casting $m^7$, which also acts as a brace for the upper ends of the sides of the frame. The operation is as follows: Upon the downward movement of the cross-head one of the pins $m'$ is in position to drag upon the surface $m^4$ until it enters the straight or guiding groove $m^6$. This causes the rotary head to be turned a twelfth of a revolution and to then be held from turning during the last part of the reciprocation of the cross-head. The pin $m'$ upon entering the straight or guiding groove $m^6$ passes over the latch $m^2$, and the latch, springing back into position, causes the said pin upon the upward movement of the cross-head to ride against the surface $m^5$, and this causes the rotary head to be turned another twelfth of a revolution and another pin $m'$ to be moved past the latch $m^3$ at the upper end of the surface $m^4$, the latch springing back into position and causing the pin upon the next movement to be drawn over the surface $m^4$.

As most of the operation of the machine requires two reciprocations of the cross-head to present two arms of the rotary head with their attached devices in succession to the work, the stop-motion devices are organized to permit two reciprocations of the cross-head to take place before the machine is stopped.

When a single shaft only is used, a large and heavy fly-wheel N with a broad flat surface preferably is used, and the start-motion mechanism is represented as connected with the fly-wheel as follows: The fly-wheel has upon its inner face one member $n$ of the clutch. The other member $n'$ slides upon the section $b^4$ of the shaft and has attached to it by means of a yoke and pins the operating-lever $n^2$. This lever is pivoted at $n^3$ and has a latch $n^4$ pivoted or attached at $n^5$ to it, which is arranged and shaped to be operated by a cam projection $n^6$ on a gear $n^7$ on the short shaft $n^8$. This gear $n^7$ meshes with the gear $a^6$ on the main shaft, the main shaft making two revolutions for every single revolution of the shaft $n^8$. The cam $n^6$ by rotation comes in contact with the latch, which is moved into its path by a spring N' and causes the latch to draw the lever $n^2$ sufficiently to disengage the member $n'$ of the clutch from the member $n$. To start the machine, the latch $n^4$ is moved from engagement with the cam projection $n^6$ by a rod $n^{10}$, pivoted to the end of the latch and connected with the treadle $n^{11}$. Upon the removal of the latch $n^4$ from engagement with the cam the spring $n^{12}$ forces the member $n'$ of the clutch into contact with the member $n$, and the machine being started the gear $n^7$ is revolved, moving the projection $n^6$ from the latch, and the latch is then moved by the spring into the path of the cam and remains in said position until the cam completing its revolution again comes in contact with the lever and causes the machine to be stopped.

The boot and shoe presenting and holding mechanism comprises a hub O, which is mounted upon the median section $a^3$ of the frame connection $a^3$ to rotate thereon, the section $a^3$ being turned to form a bearing, (not shown,) or, better, a suitable bearing being mounted thereon. This construction is illustrated in the figures. The median section $a^3$ of the frame connection $a^3$ is made square or rectangular, excepting that it is open upon the under side. Upon this is arranged a bearing piece or block S, preferably made in two parts $s\ s'$, which are bolted together by the bolts $s^2$. This bearing-block has when bolted together the rectangular or square hole $s^3$, which fits the square or rectangular section $a^3$, and its outer surface is cylindrical and forms the bearing $s^4$ for the hub. There is a sunken or depressed section $s^5$ to receive a corresponding extension $o^2$ from the hub, whereby the hub is held in place and prevented from having transverse movement thereon. In order that the hub may be secured thereto, it preferably is formed in two parts $o\ o'$ and bolted together. Its outer surface is polygonal, the hub represented in the drawings having six surfaces. Upon each of these surfaces is mounted a jack $o^3$, preferably arranged to slide thereon, each of the surfaces $o^3$ having guiding-plates $o^5$ bolted or secured thereto and shaped to lap upon the base-plate $o^6$ of the jack. This provides means for adjusting the jack horizontally upon a line running from front to back of the machine. The jack may be of any suitable form. That represented comprises the base $o^6$, the sleeve $o^6$, having the enlargement $o^7$, a spindle $o^8$, vertically movable in the sleeve by means of the screw-thread $o^9$, formed on its lower end, and the adjusting-nut $o^{10}$. The upper end of the spindle carries the last or work-support $o^{11}$. To adjust the jack and hold it upon the surface $o^3$ of the hub, I employ the back set-screw $o^{12}$ and the front set-screw $o^{13}$, the jack being held in its guides between the two screws and its position being regulated by the movement of the screws. The hub supporting the jack is in line with the rotary head, and in the organization represented in the drawings there are six jacks having lasts or work-supports used. The jacks are turned with the hub upon the section $a^3$ in one direction, preferably from front to rear, and the hub is automatically locked when each last or work-support is brought into operative position by any suitable means. On some accounts I prefer the device represented in the drawings, comprising a locking-pin for each jack, having its inner end slightly tapering and forced inward automatically by a spring $p'$ and adapted to engage the notch $p^2$ in the bearing-block S, which is so located that it engages or receives the pin P adjacent to the jack next in order to the one in operative position. Each pin is moved from engagement with the said notch by a bell-crank lever $p^3$, pivoted at $p^4$ to the jack, having a long arm $p^5$ and a short arm $p^6$, loosely connected with the head of the pin, or so that the jack and lever may be adjusted horizontally relatively thereto. The long arm of the lever, it will be seen, is in front of the jack-post and in such position that to turn the hub and jacks it is simply necessary to press forward against the upper end of the lever. This disengages the pin and at the same time permits the jack to be rotated, and the last, which is in operative position, to be moved out of operative position while the next last in order is moved into operative position, its pin automatically stopping the motion of the hub and jacks by entering the said notch or recess $p^2$. I prefer that this notch or recess be formed with its entrance $p^7$ somewhat lower than its back end $p^8$, in order that the pin may drop a little before it reaches the hole and be sure to come in contact with the back end $p^8$, which then acts as a stop in preventing further movement of the hub and jacks.

In operation when the rotary jack is used the operator stands at the front of the machine and places the shoe to be heeled upon the last or work-support next in order to the one in operative position, and he then moves the last or work-support with the jacked shoe thereon into operative position, and at the same time another last or work-support takes the place of the one moved into position and he proceeds to mount a boot or shoe upon it, having previously started the machine, which makes two revolutions and stops, attaching the heel-blank to the heel of the shoe in position at the first reciprocation and spanking on the top lift at the second reciprocation, the operator meanwhile being engaged in jacking the second shoe. The boy or attendant places the heel-blanks and top lifts upon the arms of the rotary head, and in order that this may be done to the best advantage he stands on a platform sufficiently elevated above the floor to permit the heel-blank and top lift to be placed upon or in their respective devices when they are uppermost, as this insures the easier application of the heel-blank and spanker to their attaching devices and also greater accuracy. The boy not only places the heel-blanks and top lifts in this manner, but he also removes the heeled shoes from the jacks as they are moved in successive order from the nailing devices. This assists the operator because he is not obliged to stop to remove the heeled shoe, but simply to place the shoe upon the jack, and it also gives more room about the front of the machine, as it enables the heeled work to leave the machine from the rear or back side. Any suitable receiver may be used for holding the boot or shoe upon the last or work-support when needed; but with a full last one is not required.

I have represented in Figs. 16, 17, and 18 a common shoe holding and centering device for successive use with each of the lasts or work-supports as it is brought into operative connection therewith, comprising the flat spring or yielding plates $w$ $w'$, each of which preferably has an end $w^2$, which serves as a rand-guide, being formed to enter the rand-crease between the outsole and upper, and the guard or shoulder $w^3$. Each of these plates $w$ $w'$ has a movement from the sides of the machine by a spring $w^4$, which bears against the block $w^5$, to which the end of the plate is attached. The block $w^5$ slides horizontally in a bracket $w^6$. The spring may be of any desired tension, and the two springs should be of the same tension. The guides are moved from each other by means of the levers $w^7$, pivoted at $w^8$, and connected at their lower ends by the links $w^9$, the links at their connecting ends being attached by a link $w^{10}$ to the operating-treadle $w^{11}$. In lieu of placing the springs $w^4$ behind the blocks $w^5$ a single spring may be placed below the connecting-point of the links $w^9$. In operation the operator opens by means of the treadle the plates $w$ $w'$, and when the jack has been moved sufficiently to bring a last with the work thereon between them he removes his foot sufficiently to permit the springs to force the plates inward, and of course the sections $w^2$ thereof to enter the rand-creases. The adjusting-screw $w^{12}$ is used for varying the height or level of the said plates. In some instances the section entering the rand-crease may be dispensed with, in which event the sections $w^3$ bear against the counter of the shoe below the outsole. When it is desired that the holding and centering device shall be automatically operated by the machine, I prefer the construction represented in Figs. 14 and 15. The shoe-centering devices may be like those above specified—that is, have a rand-guide and an abutment below—or the rand-guide may be dispensed with and the shoulder increased in width and lined with rubber upon its inner surface, and V V' represent the centering devices when thus formed. Each is curved in plan and each is lined with rubber $v^x$ upon its contacting surface, which is preferably vertically corrugated, as represented in Fig. 15. The centering devices each have backward-extending arms $v'$, which extend into a guiding-recess $v^2$ in a bracket $v^3$, fastened to the frame of the machine, and each of the devices is provided with the sliding movement by means of the toggles $v^4$ $v^5$, one link of which is pivoted at $v^6$ and the other of which is pivoted to the arms $v'$ of the centering device. The links are joined together at $v^7$ and are connected with a vertical push-rod $v^8$. This rod extends upward through an enlarged hole $v^9$ in a bracket or holding-block $v^{10}$, fastened preferably to the outside of the cross-head, and carries a coil-spring $v^{11}$, which surrounds the rod and rests upon a collar $v^{12}$ secured thereto. The rod also has a cross-pin $v^{13}$, which extends over or across the hole $v^9$ and rests upon the upper surface of the block $v^{10}$.

The operation of the device is as follows: When the machine is at rest, with the cross-head in its highest position, the rods $v^8$ are drawn upward, thereby inclining the links of the toggles, and the centering devices are separated from each other so that the jacks may be freely moved beneath them. Upon the starting of the machine, the jack having been moved into position between the centering devices, the blocks $v^{10}$ come in contact with the springs $v^{11}$ before the under surface of the heel-blank is brought into contact with the sole of the boot or shoe, and this causes the rod $v^8$ to be moved downward and the toggles to be straightened sufficiently to bring the centering and holding devices V V' into contact with the sides of the heel end of the shoe, and as the downward movement of the cross-head continues the tension upon the springs is increased, more firmly holding and centering the shoe upon its last or work-support. The centering devices after they are closed by this movement are no longer moved by the continued movement of the head, but they are held closed by the tension of the springs, the springs yielding or still further pressing to allow the cross-head to make its full throw.

Of course the extent of pressure against the sides of the boot or shoe which the centering and holding devices V V' exert depends upon the resistance of the spring $o^{11}$. It will be seen that this centering device is automatic in another respect, and that is that it accommodates itself without adjustment to all sizes and forms of shoes, enough throw being given the devices V V' by the toggles to permit them to center the smallest shoes.

It will be observed that with the automatic mechanism for rotating the head, the rotary head having been moved a twelfth of a revolution disposes two arms thereon, one of each set of three—that is, an arm for the reception of the heel-blank and an arm for the reception of the top-lift or auxiliary nails—upon the same level and in the best position in relation to each other and the cross-head to receive the heel-blank and top lift from the hand of the attendant.

The advantages of the invention arise largely from the simplicity and strength of its construction, the rapidity with which the work is done, the reducing of the number of movements of the operator and attendant to a very low limit, and the freedom from liability of breakage.

The invention herein described in one of its phases combines together in one organization a number of jacks adapted to be used successively to hold the work during the nailing operation and a number of heel-attaching devices or sets of heel-attaching devices, only one of which attaching devices or sets is used at a time and in conjunction with a single last or work-support, leaving disengaged or unused, so far as the act of attaching is concerned, during their operation other jacks and nailing attachments, which, however, are utilized during this period in whole or in part by being supplied with the work—such as the boot or shoe, heel-blank, nails, &c.—necessary for the next operation of the machine, and the next operation of the machine brings these parts into operative connection, while it relieves from active operation the parts which were active immediately before. In other words, the mechanism embraces in duplicate, triplicate, or multiplex arrangement a number of work-presenting and heel-attaching devices, only one full set of which, however, is adapted to be operated at one time, and all of which are interchangeable one with the other—that is, each jack is adapted to be used with all the various sets of nailing devices, although with only one at a time.

In Figs. 19, 20, and 21 I have represented mechanism for automatically starting the machine by the movement of the jacks into position, so that the bringing of the jack into such position causes the machine to be immediately started. The motion which unlatches the hub and moves forward the jack then acts additionally to start the machine. This not only saves time in the operation of the machine, but also prevents the machine from repeating, as it is not possible to again start the machine until another jack has been moved into operative position. The mechanism for accomplishing this is represented, as embodied in a series of latch-lever-depressing cams or surfaces X, one for each jack, arranged upon the hub and each having the inclined edge $x$ and the projecting undercut end $x'$. At the end of the inclined surface $x$ this end $x'$ projects slightly over the beginning of the next incline in order. The clutch-lever latch $o^3$ is provided with an arm $o^5$ of sufficient length to bring its end $o^6$ in line with the edge $x$ of the cams or surfaces X, said end, however, not extending upon said edge a distance quite equal to the horizontal throw of the member $o'$ of the clutch and of the clutch-lever $o^2$.

In use, the machine being at rest, the end $o^6$ of the latch-lever rests against the foot of one of the inclined surfaces, and upon the rotation of the hub to bring the next jack into position the lever is moved downward by the riding of the surface $x$ against it and in opposition to the latch-spring until the clutch-lever latch is disengaged from its holding-cam. The cam or incline is so shaped that this disengagement takes place the instant the jack is in operative position, and the hub-latching pin engages or enters its receiving-hole in the hub-support. The clutch-lever and latch are then immediately moved horizontally, and the driving member of the clutch engages the driven member of the clutch and the machine starts, and the latch-cam having passed the latch the latch-spring moves the latch and lever upward again in their new position—that is, in a position from, say, half an inch or an inch to the right of the one which they occupied before the latch was moved from its cam. This permits the end $o^6$ of the lever $o^5$ to be moved vertically by the side of the end $x'$ of the wedge or cam in line with the opening above it, and this latch-cam rotating comes into line with the latch and then pushes the latch and lever horizontally sufficiently to disengage the driven from the driving member of the clutch and at the same time brings the end $o^6$ of the latch-lever $o^5$ into line with the base of the next incline or cam in order, and the machine comes to rest. Of course so long as the jack which was in operative condition when the machine was started remains in said position the machine cannot be again started, and it can only be started again by moving said jack out of operative position and the next jack in order into operative position.

Having thus fully described my invention, I claim and desire to secure by Letters Patent of the United States—

1. In a heel-attaching machine, the combination with the heel-attaching and nail-driving devices, mounted on a rotary shaft, of a rotary jack-hub mounted upon a horizontal shaft at right angles to the said shaft, on which the heeling and nailing devices are mounted, slides carried by said hub, jacks mounted on said slides in radial positions relative to said hub, and adjusting and holding devices for varying the positions of said slides, substantially as set forth.

2. The combination, in a heel-attaching machine, of the frame A, the connection $a^3$ having a hole extending through the same, a rotary jack-hub mounted upon said connecting-section, the main shaft B extending through said hole, the cross-head reciprocating cranks, carried by said shaft, and the cross-head and connecting-rods $c$, $c'$, substantially as described.

3. The combination of the arm, the nail-block, a spring carried upon said arm, a washer mounted upon said arm, and pins for restricting the movement of the washer, as and for the purposes described.

4. The combination in a heel-attaching machine, of the rotary hub supporting a number of jacks having the sections $s^6$ to enter the recess $s^5$ of a bearing-block, with said bearing-block provided with said recess $s^5$, as and for the purposes described.

5. The combination, in a heel-attaching machine, of the side frames connected by the section $a^2$, the bearing-block S made in two or more parts fitted upon the inside to said section, bolted thereto and having the cylindrical bearing, with a rotary hub supporting the jacks mounted upon said bearing-block.

6. In a heel-attaching machine, the combination with a series of lasts or work-supports contained in the machine and adapted to be successively, or otherwise moved into and out of operative relation with the attaching devices, of a single set of shoe-centering devices movable toward and from each other and common to each of said lasts or work-supports.

7. The combination, in a heel-attaching machine, of a reciprocating cross-head, a rotary hub mounted thereon, appropriate heel-holding and nail-driving devices carried by said rotary hub, a series of lasts or work-supports adapted to be moved into the same operative position, and a single set of shoe-centering devices common to each of said lasts or work-supports and having vertical yielding movements.

8. The combination, in a heel-attaching machine, of a reciprocating cross-head, a rotary head or block mounted thereon and heel-holding and nail-driving devices carried by said rotary head, a series of lasts or work-supports contained in the machine and adapted to be moved into same operative position, and a single set of shoe-centering devices having an inward movement and held closed upon the shoe by a yielding pressure.

9. The combination, in a heel-attaching machine, of a reciprocating cross-head, a rotary head or block mounted thereon, heel-holding and nail-driving devices carried by said rotary head, a series of lasts or work-supports contained in the machine and adapted to be moved into the same operative position, a single set of shoe-centering devices common to each of said lasts or work-supports, and means for opening the same.

10. The combination, in a heel-attaching machine, of a rotary hub or support, a series of lasts or work-supports mounted thereon, and an automatic registering device for each jack carried upon said hub or support, a lever or arm for each jack, for disengaging said registering devices, arranged to be movable inward to make the said disengagement, and a registering hole arranged to receive the registering device of the last or work-support in advance of the one which is in operative position; whereby the operator, by one motion, unlatches the jack-support and moves the jacks or lasts onward, substantially as described.

11. In a blank-holder, a breast-gage against which the breast of the blank is adapted to be held, and two blank-holding arms connected together at or near the said breast-gage and in such a manner that the movement of one causes the movement of the other in a reverse direction, said arms extending forward from the breast-gage and being shaped and actuated to yieldingly bear against a blank near its rear end and thus serving to press and hold its breast in contact with the breast-gage.

12. The combination, in a heel-nailing machine, of a block, the plate $e^{13}$ arranged to extend upon the surface of the block, the heel-blank or top-lift grasping arms $e^{19}$ pivoted to said plate and geared together, and adjusting devices for moving said plate and arms upon the face of said block.

13. In a heel-attaching machine, the combination with a last or work-support, of shoe-centering devices adapted to move toward and from each other, a moving part of the machine for operating said shoe-centering devices, and yielding connections between said moving part and said shoe-centering devices.

14. The combination, in a heel-attaching machine, of the cross-head, the centering devices connected with said cross-head to be moved inward or toward each other upon its descent and away from each other upon its upward movement, and interposed springs between the cross-head and said centering devices, whereby said devices are caused to be closed upon the beginning of the downward movement of the cross-head and are held closed during the continuation of said downward movement, substantially as and for the purposes described.

15. The combination, in a heel-nailing machine, of the reciprocating cross-head, one or more heel-attaching devices carried thereby, one or more top-lift spankers carried thereby, a last or work-support, shoe-centering devices connected with the cross-head, as specified, and interposed springs between the cross-head and the centering devices, whereby the shoe is adapted to be centered alike during the attaching of the heel and the spanking of the top lift, as and for the purposes set forth.

16. The combination, in a heel-nailing machine, of a support for the shoe which is movable from a shoe-receiving position to a heel-attaching position, a holder or support for the heel to hold or support it in attaching position, nail-driving devices, mechanism for operating said nail-driving devices, and means for automatically starting said mechanism upon the movement of the shoe-support into nailing position and for automatically stopping said mechanism after the nailing of the heel.

17. The combination, in a heel-nailing machine, of a support for the shoe which is movable by hand from a shoe-receiving to a heel-attaching position, a holder or support for the heel to hold or support it in attaching position, a holder or support for a top lift, nail-driving and top-lift-spanking devices, mechanism for successively operating said nail-driving and top-lift-spanking devices to cause them to drive the attaching-nails and spank the top lift, and means for automatically starting said mechanism upon the movement of the shoe-support into position and for automatically stopping said mechanism after the spanking of the top lift.

18. In a heel-nailing machine, the combination with the frame-a having the connecting-section of, of a rotary jack mounted upon said connecting-section, a last carried by said jack, and rotary heel-attaching devices mounted in a reciprocating frame above said rotary jack and moving vertically toward and from the same, substantially as described.

19. In a heel-nailing machine, as a means for receiving the heel-attaching nails and a heel-blank and for moving them from a receiving position to an attaching position and for attaching the heel-blank to the sole of a boot or shoe, a pressure-arm mounted upon a horizontal pivot and adapted to be moved upon a vertical arc and to have a reciprocating movement imparted to it, a group of drivers attached to the end of said arm, and carried thereby, a nail-block into which said drivers extend, also carried by said pressure-arm and movable relatively thereto and to the drivers, a spring to act against the nail-block, and means for moving said pressure-arm and its attaching devices from a receiving position to an attaching position, and guides or stops for holding them in each of said positions, and whereby the nail-block is adapted when inverted to receive the attaching-nails and the heel to be attached by them, and whereby also the attaching-nails and heel are adapted to be moved from said receiving position upon a vertical arc to an attaching position, and whereby, by means of the vertical movement of the arm, the heel-blank is compressed against the sole of the boot or shoe, and the heel-attaching nails driven and the heel attached, all as and for the purposes described.

20. In a heel-nailing machine, in combination with a last or work-support, a pressure-arm adapted to be vertically reciprocated and provided with a movement upon a vertical arc, a group of drivers at the end of the arm supported and carried thereby, a nail-block into which the drivers extend carried by said pressure-arm and movable relatively thereto, and to the drivers, a spring to act against the block and to hold it from the drivers, the group of drivers being of a length less than the length of the holes in said nail-block whereby the said devices are adapted to receive attaching-nails and a heel-blank, transfer them to a driving position and attach the heel-blank to the boot or shoe by driving the nails through the heel-blank in a manner to leave the outer ends of the attaching-nails slightly projecting from the surface of the attached heel, as and for the purposes described.

21. In a heeling-machine, a vertically-reversible heel-attaching and top-lift-applying device comprising a reversible head having two arms in line with each other, one of which has a gang of drivers at the end and a yielding perforated nail-block attached to it to be movable toward and from its end, but which nail-block is non-movable laterally in relation to its carrying-arm, and the other of which arms has attached to its end a top-lift spanker and holder.

22. The combination, in a heel-nailing machine, of a reciprocating pressure-head and two arms or supports mounted thereon to be movable alternately into and out of operative position, and devices for attaching a loaded heel-blank carried by one of said arms and comprising a group of drivers at the end of the arm, and a yielding heel-block into which the drivers extend, carried by the said arm and having a flat outer surface adapted to receive a heel-blank of any size, the upper surface of said heel-blank resting against the surface of the block and the nails entering the holes thereof, and unyielding top-lift centering, holding, and spanking devices rigidly attached to the second of said arms but adapted to be adjustable crosswise it, as and for the purposes described.

23. In a heel-nailing machine, the combination of a reciprocating pressure-head, two arms mounted thereon, each to be movable from an operative to an inoperative position, a heel-blank-attaching device carried by one of said arms, comprising a group of drivers at the end of the arm and a yielding heel-block attached to the arm and into which the drivers extend, and top-lift centering, holding and spanking devices attached to the other of said arms, the first of said arms and its attached yielding block being longer than the second of said arms with its spanking-block, whereby the first of said arms is adapted to deliver pressure directly to a heel-blank at a different level from that delivered by the second arm, as and for the purposes described.

24. In a heel-nailing machine, the combination of a pressure-head having a wide opening extended through it, a shaft extending across said opening and a rotary head carried by said shaft and having two arms, loaded heel-attaching devices, of the character specified, attached to one of said arms, and a top-lift carrying, holding and spanking device attached to the other of said arms, the said rotary head being adapted to be turned so as to permit the loaded heel-blank and the top lift to be applied to their respective attaching devices through the upper part of the opening in said head, or when they are uppermost, and to permit them to carry said loaded heel-blank and top lift and to attach them successively when they are in their lowest position, as and for the purposes described.

25. In a heeling-machine, a vertically-reversible nail-receiving and nail-driving and heel-blank-holding device comprising a pressure-arm and means for reversing it, a gang of drivers at the end of said arm, a yielding perforated nail-block attached to said arm to be movable toward and from its end but non-movable laterally in relation thereto, and heel-holding devices for holding a heel-blank to the face of said nail-block.

26. In a heel-nailing machine, the combination of a reciprocating pressure-head, a rotary head carried thereby having a series of groups of arms, each group of which consists of two arms, loaded heel-blank-attaching devices carried by one of said arms, top-lift centering, holding and spanking devices carried by the other of said arms, automatic means for rotating said head, and automatic devices for stopping the machine at the end of two reciprocations of the cross-head.

27. In a heel-nailing machine of the character specified, the combination of a pressure-arm circular in shape and having a flat face to which a block holding a gang or group of drivers is attached, a sleeve or slide-block having a circular hole of the size of the arm mounted thereon above the driver-holding block, a yielding heel-block attached by plates or arms to said sleeve or slide-block and a spring surrounding the arm to bear against the said sleeve or slide-block and force it outwardly.

28. As an attachment to the arm of a heel-attaching machine, the combination of a block holding drivers and having a spindle adapted to be extended into the hole of a holding-arm and to be locked thereto, a sleeve at the upper side of said driver-block, a movable heel-block upon the under side thereof, having holes into which the drivers extend, and arms or plates connecting the heel-block with the sleeve.

29. In a heel-nailing machine, the combination with a last or work-support adapted to present and hold an unheeled boot or shoe, of an arm movable into and out of operative position relative to said last or work-support, a gang of drivers attached to the end of the said arm, a templet having holes into which the ends of said drivers extend, said templet being joined to said arm so as to be movable therewith into and out of operative position, and being also movable toward and from the end of said arm, and a spring for pressing said templet outward, the said templet having an unobstructed operating-face and being thus adapted to receive thereon a loaded heel-blank with the projecting ends of the nails extending into its holes, so that the face of said heel will be in contact with the operating-face of said templet; the whole being so organized that upon the movement of the arm and templet to operative position, and upon the vertical movement of the arm, the heel-blank will be forced against the sole of the boot or shoe with an attaching pressure and the attaching-nails will be driven through the heel-blank into the sole of the boot or shoe.

30. In a heel-attaching machine, a series of heel-attaching devices comprising a number of radial pressure-arms connected together and adapted to be brought in successive or any other order over a jack common to all, each heel-attaching arm having a group of drivers at its end, and a yielding perforated nail-block attached to it to be movable toward and from its end but which nail-blocks are non-movable laterally in relation to their carrying-arms.

31. In a heel-attaching machine, a series of heel-attaching and top-lift-applying devices comprising a number of radial pressure arms connected together and adapted to be brought in successive or any other order over a jack common to all, each alternate arm having a group of drivers and a yielding perforated nail-block which is movable toward and from the end of its carrying-arm, but which nail-blocks are non-movable laterally in relation to their carrying-arms, the interposed or other alternate arms having at their ends top-lift spanking and holding devices.

32. In a heel-attaching machine, a series of movable groups of heel-attaching and top-lift-applying devices, each group consisting of an arm, a group of drivers attached to the end of said arm and carried thereby, a nail-block into which the drivers extend also carried by said arm and movable relatively thereto and to the drivers, a spring to act against the nail-block, and a second arm and adjustable top-lift carrying, centering and spanking devices attached thereto, the drivers and nail-holes of the heel-attaching device of each group differing as to arrangement or number, as and for the purposes described.

33. In a heel-attaching machine the combination with a suitable supporting-frame, of a movable head having two arms mounted in said frame, one of said arms carrying at its end a gang of drivers and perforated nail-block attached thereto and movable toward and from the same but non-movable laterally in relation thereto, and the other of which arms carries at its end top-lift-applying devices.

34. In a heel-nailing machine, in combination with nail-driving devices, a vertically-reversible heel-carrier comprising a block having a flat face, its movable supporting-arm, the said block being non-movable laterally in relation to the said supporting-arm, and heel-holding devices to hold the heel to the face of the carrier-block.

35. The combination, in a heel-nailing machine, of a support for the shoe which is movable from a shoe-receiving position to a heel-attaching position, an automatic device for locking the said support when said support is moved to its attaching position, a holder or support for the heel to hold or support it in attaching position, nail-driving devices, mechanism for operating said nail-driving devices, and means for automatically starting said operating mechanism upon the automatic locking of the said shoe-support in nailing position and devices for automatically stopping said operating mechanism after the nailing of the heel.

36. The combination, in a heel-nailing machine, of a support for the shoe which is movable from a shoe-receiving position to a heel-attaching position, a holder or support for the heel which is movable from a heel-receiving position to a heel-attaching position, nail-driving devices, mechanism for operating said nail-driving devices, and means for automatically starting said mechanism upon the movement of the shoe-support into attaching position and for automatically stopping said mechanism after the nailing of the heel.

37. The combination, in a heel-attaching machine, of a support for the shoe which is movable from a shoe-receiving position to a heel-attaching position, a holder or support for the heel which is movable from a heel-receiving position to a heel-attaching position, a holder or support for the top lift which is movable from receiving position to a spanking position, nail-driving devices, mechanism for operating said nail-driving devices and for moving said heel-holder and said top-lift holder from receiving to attaching positions, and means for automatically starting said mechanism upon the movement of the shoe-support into nailing position and for automatically stopping said mechanism after the spanking of the top lift.

38. A plate or blank holder having a front gage against which the breast of the lift or blank is adapted to be pressed, and two yielding separable rear pressers connected with each other to be movable uniformly in respect to the front gage, said pressers being constructed and arranged to bear against the back edge of the lift or blank upon each side of a median line drawn through its center from front to back, and automatic means to close said pressers toward each other and the breast-gage with a yielding closing movement.

39. In a heel-attaching machine, a vertically-reversible heel carrier and attaching device consisting of a supporting-arm provided with nail-drivers, and a nail-block carried by said supporting-arm and arranged thereon so as to be movable toward and from it.

40. In a heel-nailing machine, a heel carrier and attaching device turning in a vertical plane and consisting of a supporting-arm provided with a gang of drivers and carrying a nail-block movable toward and from said supporting-arm to coöperate with said gang of drivers.

41. In a heel-attaching machine, a heel carrier and attaching device movable vertically in the arc of a circle and consisting of a supporting-arm carrying a gang of drivers, and a nail-block arranged to coöperate with said gang of drivers and capable of movement toward and from said supporting-arm.

42. In a heel-nailing machine, as a means for attaching a heel-blank to a boot or shoe and a separate top lift to the attached heel-blank, a vertically-reversible head having two arms, one of which arms is adapted to carry and attach the heel and is provided with nail-drivers and a nail-block arranged on said arm so as to be movable toward and from it, and the other of which arms is provided with top-lift-applying devices.

43. In a heel-nailing machine, as a means for attaching a heel to a boot or shoe and a separate top lift to the attached heel, a head turning in a vertical plane and having two arms, one of which arms is adapted to carry and attach the heel and is provided with a gang of drivers and a nail-block movable toward and from said arm, to coöperate with said gang of drivers, and the other of which arms is provided with top-lift-applying devices.

44. In a heel-nailing machine, a head carrying two arms movable vertically in the arc of a circle, one of which arms is adapted to carry and attach the heel and is provided with a gang of drivers and a nail-block movable toward and from said arm, to coöperate with said gang of drivers, and the other of which arms is provided with top-lift-applying devices.

45. The combination, in a heel-nailing machine, of a support for the shoe, an arm, a holder or support for the heel, nail-carrying and nail-driving devices mounted upon said arm, automatic mechanism for moving said arm with the heel holder or support and said nail-carrying and nail-driving devices simultaneously from a receiving to an attaching and driving position, and means for operating the nail-driving devices to drive the nails.

46. The combination, in a heel-nailing machine, of a support for the shoe, an arm, a holder or support for the heel, nail-carrying and nail-driving devices mounted upon said arm, top-lift-applying devices, automatic mechanism for moving successively into operating position first the said arm with the heel holder or support and the said nail-carrying and nail-driving devices, and second said top-lift-applying devices, and means for operating the nail-driving devices while the heel-holder and nail-carrier are in operative position.

47. The combination, in a heel-nailing machine, of a series of devices each comprising a holder or support for a heel, nail-carrying and nail-driving devices, an arm upon which they are mounted, automatic mechanism for moving said series of devices progressively or successively from a receiving to an attaching position and for successively operating the nail-driving devices of each when in attaching position.

48. The combination, in a heel-nailing machine, of a series of devices each comprising a holder or support for the heel, nail-carrying and nail-driving devices, an arm upon which said nail-carrying and nail-driving devices are mounted, a top-lift-applying device, automatic mechanism for moving said arm with the said heel-holder and nail-carrying and nail-driving devices and said top-lift-applying devices progressively or successively from a receiving to an attaching position and for successively operating the nail-driving devices of each and the top-lift-applying devices when in attaching position.

FREEBORN F. RAYMOND, 2D.

In presence of—
A. P. PORTER,
T. BALL.